April 18, 1939.     G. W. BORNMAN     2,155,296
COTTON PICKER
Filed March 9, 1938     4 Sheets—Sheet 1

Fig. 1.

Inventor
G. W. Bornman.

By Lacey & Lacey, Attorneys

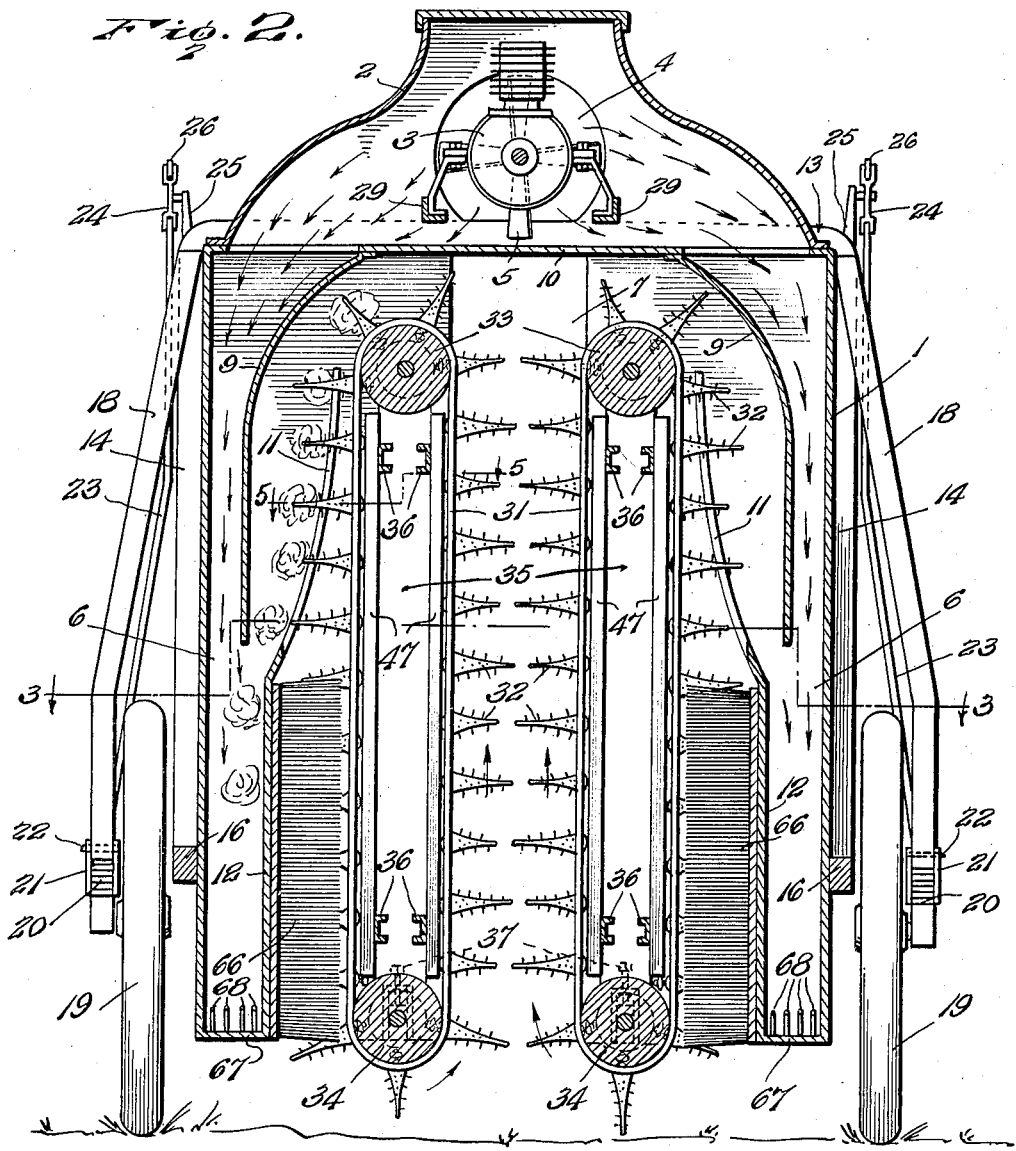

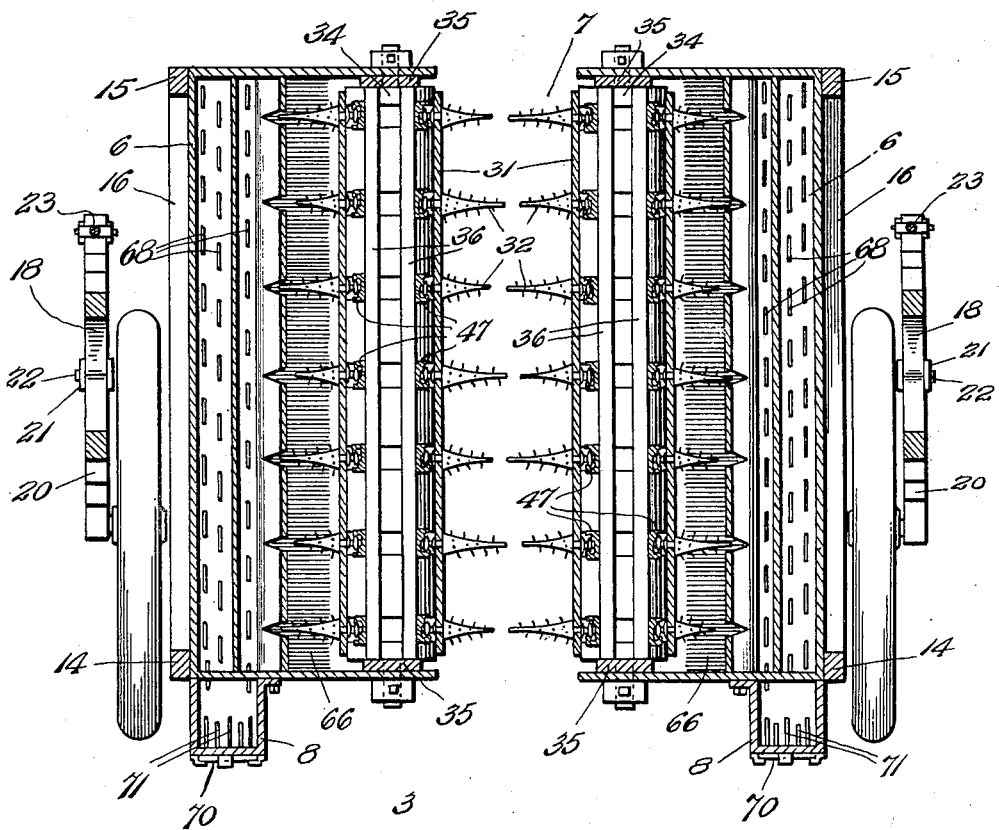
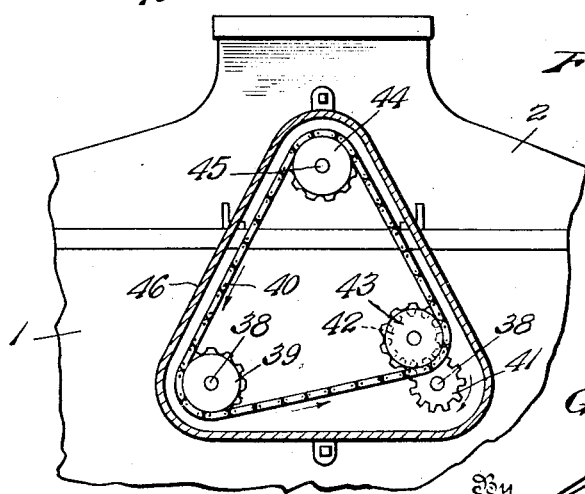

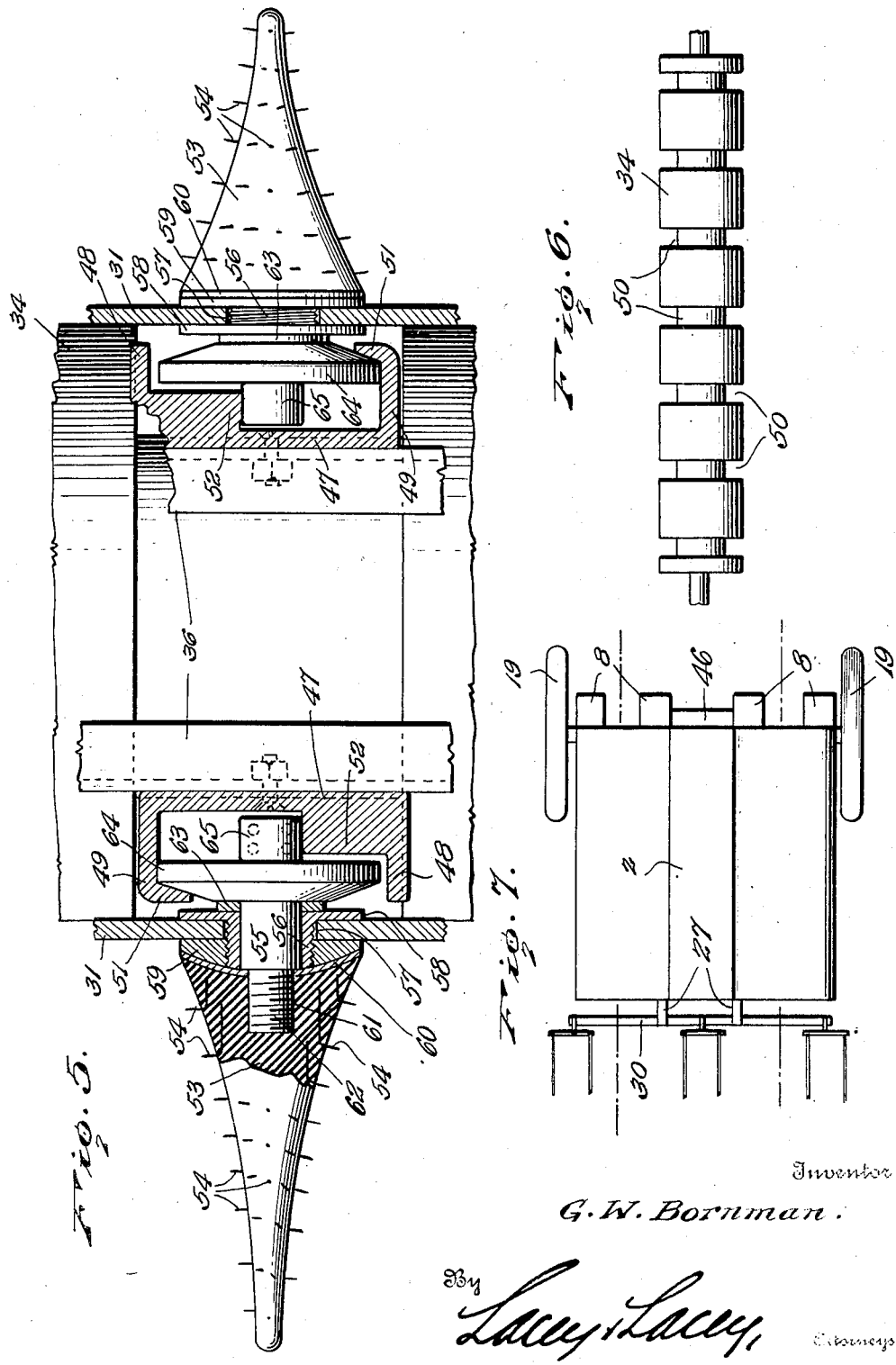

Patented Apr. 18, 1939

2,155,296

UNITED STATES PATENT OFFICE 2,155,296

COTTON PICKER

Graham W. Bornman, Clarksdale, Miss.

Application March 9, 1938, Serial No. 194,955

11 Claims. (Cl. 56—43)

This invention relates to a cotton-picking machine, and it is one object of the invention to provide a machine of such construction that it may be drawn across a field of cotton in straddling relation to a row of growing plants and remove the cotton from both sides of the plants as it progresses along a row.

Another object of the invention is to provide a machine of this character wherein the cotton is removed from the plants by spindles carried by belts or aprons which extend vertically and have upwardly moving flights presented towards the cotton plants, means being provided for rotating the spindles in one direction as they move upwardly and rotating the spindles in an opposite direction as they move downwardly. It will thus be seen that the cotton will be wound about the spindles and drawn from the bolls as the spindles move upwardly and during downward movement of the spindles rotation thereof in an opposite direction will cause the cotton to be unwound from the spindles for removal therefrom.

Another object of the invention is to provide a cotton-picking machine wherein an air blast for cooling a motor, by means of which the aprons are run, will serve to carry the cotton away from the spindles as it is released therefrom and through discharge spouts to a suitable receptacle.

Another object of the invention is to provide a cotton picker wherein a frame or carriage is supported by ground-engaging wheels carried by springs which are adjustably mounted in order that the cotton picker may be vertically adjusted to accommodate itself to the height of the plants from which cotton is to be removed during use of the machine.

The invention is illustrated in the accompanying drawings, wherein

Figure 1 is a view showing the improved cotton-picking machine in side elevation with certain portions in section, Figure 2 is a sectional view taken vertically through the cotton-picking machine along the line 2—2 of Figure 1, Figure 3 is a transverse sectional view taken horizontally through the cotton-picking machine along the line 3—3 of Figure 2, Figure 4 is a fragmentary sectional view taken along the line 4—4 of Figure 1, Figure 5 is an enlarged view taken along the line 5—5 of Figure 2 and illustrating the manner in which the spindles are mounted and rotated, Figure 6 is a view of one of the rollers about which the belts or aprons pass, and Figure 7 is a top plan view of a double row picker and illustrating the manner in which draft animals are connected thereto.

This improved cotton-picking machine has a casing 1 which is formed of sheet metal and at its top provided with a hood 2 which tapers transversely of the casing, as shown in Figure 2, and constitutes a shield for a motor 3 as well as defining an air tunnel having an inlet opening 4 at its front end so that, when the motor is in operation, the fan 5 of the motor may draw air inwardly through the opening 4 and force this air rearwardly along the motor for cooling the same. The casing has side sections defining chambers 6 and a central passage 7 through which the cotton plants pass when the machine is drawn across a field in straddling relation to a row of cotton. Referring to Figure 2, it will be seen that the chambers 6 extend vertically and have their upper portion communicating with the hood 2 so that air may pass downwardly from the hood through the chambers to lower ends thereof and out through spouts 8 at the back of the machine through which cotton is to be delivered to bags or other containers for the same. Baffle plates 9 which are curved vertically extend downwardly in the chambers 6 from opposite sides of the plate 10 so that air passing downwardly will take the path indicated by the arrow in Figure 2 and the downwardly flowing air currents cause a suction through the upper ends of inner sides of the chambers. Therefore, cotton which is delivered into the upper portions of the chambers between the baffle plates and the slotted upper portion of the inner side walls 12 of the chambers will be drawn downwardly toward the bottoms of the chambers and pass outwardly through the discharge spout.

The casing is mounted in a frame of metal bars which may be referred to as a chassis and is indicated in general by the numeral 13. The front and rear yokes 14 and 15 of the frame straddle the casing 1, as shown in Figures 1 and 2, and lower ends of the side arms of these yokes are connected by bars 16 so that the yokes will be held in proper spaced relation to each other and a rigid frame formed to which the walls of the casing may be secured by a suitable number of rivets 17. V-shaped struts 18 are disposed at opposite sides of the frame and casing and each has upper ends of its upwardly diverging arm welded or otherwise firmly secured to upper ends of the side arms of the yokes 14 and 15. The struts diverge downwardly from walls of the casing 1 for a portion of their length, as shown in Figure 2, and have their lower portions disposed parallel to the casing and the frame, thus providing ample space betwen the frame and the lower end portion of the struts to accommodate the wheels 19. These wheels 19 have their axles connected with rear ends of springs 20 which extend longitudinally of the machine and are suspended from lower ends of the struts 18 by shackles 21 disposed midway the ends of the springs and pivoted to the struts, as shown at 22. At their forward ends, the springs are pivoted to lower ends of rods 23, and upon referring to Figure 1, it will be seen that upper ends of these rods are pivoted to bell crank levers 24 carried by brackets 25 at opposite sides of the casing. Short rods or links 26 extend forwardly from upper arms of the bell crank levers and are connected with foot pedals or levers 27 which are in the form of latch levers and adapted to be held in an adjusted position by racks 28. It will thus be seen that by manipulating the pedals or levers 27 the springs may be tilted about the pivot 22 and the casing vertically adjusted to dispose it the proper distance from the ground and thus accommodate it to the height of the cotton plants from which cotton is to be removed. The upper horizontally extending bridge portion of the yokes 14 and 15 serve not only to brace the frame 13 and the casing 1 against transverse strains but also constitute supports for the bars 29 of angle metal which extend longitudinally of the machine and serve as supports for the engine. These bars 29 project forwardly from the yoke 14 and provide members to which a draft equalizer apparatus 30 may be secured and a suitable number of draft animals hitched to the machine for drawing it across a field. Such an arrangement of draft appliance has been shown in Figure 7, and in this figure, a cotton picker has been illustrated which is of the double row type instead of a single row, it being understood that, in order to provide a machine for picking more than one row, it is merely necessary to widen it and provide at each side of the engine a casing structure defining a vertically extending passage 7 open at its front and rear ends.

In order to remove the cotton from the growing plants, there has been provided endless belts or aprons 31 carrying spindles 32. Each belt or apron carries a large number of the spindles which are distributed in rows extending vertically, and attention is called to the fact that each row consists of alternately arranged long and short spindles. It should also be noted that the spindles of the confronting flights of the two aprons are so arranged that, as the spindles move upwardly with the confronting flight, the long spindles of each belt will be disposed in opposed and aligned relation to the short spindles of the other belt or apron. This alternate arrangement of long and short spindles also occurs transversely of the belt, and from an inspection of Figures 2 and 3, it will be seen that due to this distribution of long and short spindles which project toward each other through the cotton plants cotton growing upon all portions of the plants will be engaged by the spindles during upward movement thereof and the cotton removed from the bolls.

The aprons are trained about upper and lower rollers 33 and 34 which are rotatably mounted between uprights or bearing strips 35 mounted in vertical positions at opposite ends of the channel bars 36 which extend longitudinally of the machine adjacent the rollers. The upper rollers 33 are rotatably mounted in bearings formed at upper ends of the uprights 35 and the lower rollers are not only rotatably mounted but their bearings are shiftable vertically and adapted to be held in vertically adjusted positions by set screws 37. Therefore, the lower rollers may be vertically adjusted to tighten the aprons and maintain them at proper tension to cause movement of the aprons when the upper rollers which serve as drive rollers are rotated. These upper rollers have their shafts 38 projecting rearwardly from the casing 1 and one carries a sprocket wheel 39 about which is trained a sprocket chain 40 while the other carries a gear or pinion 41 meshing with a gear or pinion 42 which turns with an idler sprocket 43, about which the sprocket chain 40 is also engaged. The upper portion of the sprocket chain is engaged about a sprocket wheel 44 carried by the engine shaft 45 which projects from the rear end of the hood 2. Due to the provision of the idler sprocket and the gears 41 and 42, the upper rollers will turn in opposite directions, and each of the belts or aprons will have its flight which is exposed in the channel 7 moving upwardly and as the spindles reach the upper end of the channel 7 the spindles will move into the chambers 6 and then downwardly therein with the spindles moving downwardly through the slotted upper portion of the inner wall 12. In view of the fact that these slotted upper portions of the walls or plates 12 extend at an incline, the spindles will be gradually shifted outwardly through the slots as they move downwardly, and the cotton will be removed from the spindles. A shield 46 is secured about the sprocket and the chain to protect them from exposure and also prevent cotton or the leaves or twigs of the cotton plants from becoming caught and tangled in the sprocket wheels and the chain. Guide bars or tracks 47 extend vertically in spaced relation to each other between the upper and lower rollers and are secured against the channel bars 36 with their side flanges 48 and 49 projecting away from the channel bars towards the plates of the apron. Grooves 50 are formed in the rollers to accommodate end portions of the bars 47 in case the lower rollers should be shifted upwardly a sufficient distance to dispose lower ends of the bars in the grooves. These grooves also accommodate turning means which have been provided for the spindles and thus allow the aprons to remain in close contacting engagement with the rollers while passing about the rollers. Referring particularly to Figure 5, it will be seen that each of the channel bars or tracks 47 has its side flange 49 formed with a longitudinally extending inwardly projecting lip 51 and for a portion of its width each channel bar is inwardly thickened to form a shoulder 52.

Each of the spindles is formed as shown in Figure 5, and referring to this figure, it will be seen that each spindle has a tapered body 53 formed of rubber or a similar yieldable material. Wires are carried by the rubber body and have spurs 54 which project outwardly from the spindles and are arranged in spirally extending paths so that during upward movement of the spindles in the channels 7 rotation of the spindles may cause the cotton to be caught and wrapped about the spindles and thus drawn loose from the cotton bolls of the cotton plants. A stub axle or shaft 55 is provided for spindles and is rotatably engaged through a bushing 56 which extends through an opening 57 formed in the apron and is formed with an annular disk-like head 58 at its inner end to limit outward movement of the bushing through the apron. A securing nut 59 is screwed upon the protruding portion of the bushing and has a convex surface for engagement by the concaved surface of a disk or liner 60 which has flat contacting engagement with the concaved inner end of the spindle body. A center opening is formed through the liner 60 and registers with a socket 61 formed axially of the spindle body and having threaded walls for engagement by the threads of the stem 62 formed by reducing and threading the end portion of the shaft 55. A spacing washer 63 fits about the shaft 55 against the flanged end of the bushing 56 and the portion of the shaft which projects from the inner face of the apron carries a friction disk 64 for engagement with the flanges 49 and 51 of the channel bars. Beyond the friction disk the shaft has a reduced end about which is mounted a roller 65 carrying ball bearings so that the roller may turn freely about the shaft. As the spindle moves vertically, the roller 65 will have contacting engagement with the side face of the shoulder 52 and the friction disk will thus be held in engagement with the flange 49 and cause rotation of the spindle. The spindles during upward movement will thus be turned in one direction and during downward movement will be rotated in a reverse direction.

When this cotton-picking machine is in use, it is drawn across a field of growing cotton plants in straddling relation to a row of plants and the plants move through the tunnel 7 from the front end of the machine towards the rear end thereof. The motor or engine 3 is set in operation to transmit rotary motion to the upper rollers 33 and thus impart movement to the belts or aprons with the rollers turning in opposite directions so that the flights of both aprons which are presented at opposite sides of the tunnel will move upwardly. During this upward movement engagement of the rollers 65 with the shoulders 52 will hold the friction disk in engagement with the flanges 49 so that rotary motion will be imparted to the spindles and the spurs 54 will make contact with the cotton and cause it to be wrapped about the spindles and thus drawn from the cotton bolls. Upon reaching the upper rollers the spindles will move about the same with the disk 64 and the rollers 65 disposed within the groove 50 of the rollers and the spindles will then move downwardly with their friction disk and rollers 65 in engagement with the flanges 49 and shoulders 52 of the inner track bars 47. During this downward movement the spindles will be turned in an opposite direction from that in which they rotated during their upward movement and this movement will tend to unwind the cotton from the spindles as the spindles move downwardly through the slots in the upper portions of the walls 12. The cotton will thus be dislodged from the spindles and will not only be carried downwardly by the force of gravity but also by suction exerted by the air which is forced downwardly through the chambers 6. A slight amount of cotton may adhere to the spurs of the spindles but as the spindles move through brushes 66 secured against the inner walls or plates 12 of the chambers 6 the spindles will be thoroughly cleaned before they again move upwardly. The fact that rotary motion is frictionally imparted to the spindles will prevent damage in case the twigs of a caught cotton plant should be caught by the spurs, this being due to the fact that the pull exerted may then rotate a spindle in a reverse direction as it moves upwardly and release the caught portion of the cotton plant. The cotton which is released from the downwardly moving spindles is carried downwardly to the bottoms of the chambers 6 and rearwardly by the air current and then through the discharge spouts 8 which extend upwardly and rearwardly from the back of the machine. Bags for receiving the cotton may be tied about the upper ends of the spouts or any receptacles desired provided to receive the cotton.

It is desirable to separate trash from the cotton as the cotton passes through the chambers 6 and thus cause cotton free from trash to be delivered through the spouts 8. Referring to Figures 1, 2 and 3, it will be seen that the chambers 6 each has a solid bottom 67 carrying a plurality of upstanding pins 68. The pins are arranged in rows and in staggered relation to each other, as shown in Figure 3, and their upper portions are bent to extend at an incline towards the rear ends of the chambers. Each chamber has a vent 69 at its rear end for which a door or closure plate 70 is provided which is slidably mounted for movement into and out of a closed position. Passage of cotton through the vent openings 69 must be prevented, and in order to do so, there has been provided a screen in the lower rear portion of each chamber formed of rods 71 which are disposed diagonally in staggered relation to each other and are firmly anchored at their upper and lower ends. Cotton which is carried downwardly in the chambers 6 will move rearwardly along the bent upper ends of the pins 68 until it strikes the rods 71 and will then pass upwardly through the spouts 8 but heavy trash will move along the bottoms 67 of the chambers and between the rods 71 of the screens so that the trash passes out through the openings 69. By adjusting the doors 70 escape of air through the openings 69 may be controlled and flow of air through the vents and the spouts so regulated that the cotton and the trash will follow their proper paths.

Having thus described the invention, what is claimed as new is:

1. In a cotton picker, a casing having vertically disposed chambers spaced transversely from each other and a tunnel between the chambers, endless members disposed vertically and having flights moving vertically in one direction at opposite sides of the tunnel and other flights moving vertically in an opposite direction within the chambers, spindles rotatably carried by said endless members, means for imparting rotary motion in one direction to said spindles as the spindles move through the tunnel, means for rotating the spindles in an opposite direction as they move through the chambers, slotted plates being provided in said chambers through which the spindles pass during movement thereof through the chamber whereby cotton carried by the spindles will be dislodged therefrom as they move through the chambers, and brushes carried by said plates for cleaning engagement with the spindles after movement of the spindles through the slots.

2. In a cotton picker, a casing having a plant-receiving tunnel and chambers at opposite sides thereof provided with lower outlets, a hood communicating with upper ends of said chambers, a motor in said hood having a fan for cooling the motor and directing air currents downwardly through the chambers, upper and lower rollers extending horizontally adjacent upper and lower ends of said chambers, endless belts trained about said rollers and having flights at opposite sides of the tunnel and other flights within the chambers, spindles projecting from said belts and rotatably mounted, means for transmitting rotary motion from said motor to the upper rollers whereby the endless belts may be set in motion and move their flights within the tunnel upwardly and their flights within the chambers downwardly, means for rotating the spindles in one direction as they move upwardly and in an opposite direction as they move downwardly, means for dislodging cotton from the spindles during downward movement thereof, brushes for engaging said spindles and thoroughly cleaning the same after dislodgment of cotton therefrom by the last-mentioned means, and means for directing air currents downwardly through the chambers for carrying the cotton to outlets adjacent lower ends of the chambers.

3. In a cotton picker, chambers spaced from each other and providing a tunnel between the same, endless carriers disposed vertically and having flights movable upwardly at opposite sides of the tunnel and other flights for moving downwardly through the chambers, spindles carried by said endless members, each endless member having certain of its spindles relatively short and other spindles relatively long, the long spindles of one endless member being disposed in opposed and aligned relation to the short spindles of the other endless member, means for dislodging cotton from the spindles as they move downwardly in the chambers, and means for directing air currents downwardly through the chambers for carrying the dislodged cotton to outlets adjacent lower ends of the chambers.

4. In a cotton picker, a casing having spaced chambers formed with outlets and a tunnel between the chambers, means for removing cotton from plants in the tunnel and delivering the cotton into the chambers including endless carriers and spindles carried thereby, certain of the spindles being relatively long and others relatively short and the short spindles of each endless carrier being disposed in opposed and aligned relation to long spindles of the other carrier, and means for directing air currents through said chambers for carrying cotton to the outlets of the chambers.

5. A cotton-picking machine including cotton-receiving chambers and means for removing cotton from plants and delivering the cotton into the chambers comprising endless carriers, and spindles carrier by said carriers and projecting therefrom, each carrier having a plurality of alternately arranged long and short spindles, the short spindles of each carrier being disposed in opposed and aligned relation to the long spindles of the other carrier.

6. A cotton-picking machine comprising a casing having chambers spaced transversely from each other and a plant-receiving tunnel between the chambers, rollers disposed horizontally and rotatably mounted adjacent upper and lower ends of said chambers, endless belts trained about said rollers and having flights for moving upwardly through the tunnel at opposite sides thereof and flights for moving downwardly in the chambers, plates extending diagonally toward the upper rollers and formed with vertically extending slots, brushes below said slots, spindles rotatably carried by said carriers in position for moving through the slots and the brushes as they move downwardly, mans for imparting rotary motion to the spindles in one direction as they move upwardly through the tunnel, means for rotating the spindles in an opposite direction as they move downwardly through the slots and the brushes, and means for imparting rotary motion to said rollers.

7. A cotton-picking machine comprising a casing having cotton-receiving chambers spaced transversely from each other and a plant-receiving tunnel between the chambers, a hood for said casing communicating with upper ends of said chambers, a motor in said hood having a fan for cooling the motor and directing air currents downwardly through the chambers, upper and lower rollers rotatably mounted, endless belts trained about the upper and lower rollers, the lower rollers being vertically adjustable for tensioning the endless belts, the upper rollers having shafts projecting rearwardly from said casing and the motor having a shaft projecting rearwardly from the hood, means for transmitting rotary motion from the engine shaft to the shafts of the upper rollers and causing one roller to rotate in an opposite direction to the other whereby endless belts will each have a flight moving upwardly at a side of the tunnel and a flight moving downwardly in a chamber during rotation of the rollers, spouts leading from outlets at the rear ends of lower portions of said chambers and extending upwardly and rearwardly from the casing, spindles rotatably carried by said belts for removing cotton from plants as they move upwardly through the tunnel, means for dislodging the cotton from the spindles as they move downwardly in the chambers, means for rotating the spindles in one direction as they move upwardly, and means for rotating the spindles in an opposite direction as they move downwardly.

8. A cotton-picking machine comprising a casing having cotton-receiving chambers and a tunnel between the same, upper and lower rollers, endless belts trained about said rollers, spindles carried by said belts, tracks disposed vertically and each having side flanges along its side and a longitudinally extending shoulder between the side flanges, one flange being formed with an inwardly projecting lip, friction disks carried by said spindles for engaging the flanges having the lips and imparting rotary motion to the spindles during movement of the endless belts, and roller bearings carried by the spindles for engaging said shoulders and urging the friction disks into engagement with the flanges having the lips.

9. In a cotton picker, a casing having chambers, rollers, endless belts trained about said rollers, track bars extending between the upper and lower rollers and each having side flanges and a longitudinally extending shoulder between the side flanges, one flange being formed with an inwardly directed lip, and spindles rotatably carried by said belts, each spindle comprising a tapered body, a bushing passing through the endless belt carrying the roller, a disk threaded upon said bushing, a shaft journaled through said bushing and having a threaded end portion, said body being screwed upon the threaded end portion of the shaft and abutting said disk, a friction roller carried by said shaft and moving between the flanges of the cooperating track bar, and a roller carried by said shaft for engaging the shoulder of the track bar and urging the friction disk into engagement with the flange having the lip.

10. A cotton-picking machine comprising a casing having cotton-receiving chambers and a tunnel between the chambers, upper and lower rollers adjacent upper and lower ends of said chambers, endless belts trained about said rollers and having flights for moving upwardly at opposite sides of the tunnel and flights for moving downwardly in the chambers, spindles carried by said belt for removing cotton from plants during upward movement thereof, means for dislodging cotton from the spindles during downward movement thereof, a frame about said casing, springs carried by lower portions of said frame and extending longitudinally of the casing, ground-engaging wheels carried by the rear ends of said springs, rods extending upwardly from the front ends of said springs, bell crank levers pivoted to said casing and each having one arm connected with the upper end of a rod, latch levers, and links connecting the latch levers with the bell crank levers.

11. A cotton-picking machine including a casing, a frame for said casing V-shaped yokes at opposite sides of said frame, springs extending longitudinally of the casing, shackles intermediate ends of the spring and pivoted to lower ends of said yokes, ground-engaging wheels carried by rear ends of said spring, and adjusting means connected with front ends of the springs.

GRAHAM W. BORNMAN.